United States Patent
Zhang et al.

(10) Patent No.: US 10,991,283 B2
(45) Date of Patent: Apr. 27, 2021

(54) DECIMATED BURN-IN COMPENSATION WITH PIXEL SHIFTING

(71) Applicant: Apple Inc., Cupertino, CA (US)

(72) Inventors: Sheng Zhang, Milpitas, CA (US); Chaohao Wang, Sunnyvale, CA (US); Michael Slootsky, Santa Clara, CA (US); Yifan Zhang, San Carlos, CA (US); Tae-Wook Koh, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/403,366

(22) Filed: May 3, 2019

(65) Prior Publication Data

US 2020/0074900 A1 Mar. 5, 2020

Related U.S. Application Data

(60) Provisional application No. 62/726,876, filed on Sep. 4, 2018.

(51) Int. Cl.
*G09G 3/00* (2006.01)
*G09G 3/3208* (2016.01)
*G09G 3/36* (2006.01)

(52) U.S. Cl.
CPC ............ *G09G 3/006* (2013.01); *G09G 3/007* (2013.01); *G09G 3/3208* (2013.01); *G09G 3/36* (2013.01); *G09G 2320/0233* (2013.01); *G09G 2320/0285* (2013.01); *G09G 2320/046* (2013.01); *G09G 2330/10* (2013.01)

(58) Field of Classification Search
None
See application file for complete search history.

(56) References Cited

U.S. PATENT DOCUMENTS

| | | | |
|---|---|---|---|
| 7,663,663 B2 | 2/2010 | Prusia et al. | |
| 2007/0115384 A1* | 5/2007 | Furukawa | H04N 9/045 348/335 |
| 2009/0046089 A1 | 2/2009 | Zhuang et al. | |
| 2011/0254976 A1* | 10/2011 | Garten | H04N 5/2355 348/229.1 |
| 2015/0009416 A1* | 1/2015 | Tamayama | H04N 9/3185 348/746 |
| 2017/0206689 A1* | 7/2017 | Eo | H04N 9/646 |
| 2019/0080666 A1 | 3/2019 | Chappalli et al. | |
| 2019/0244582 A1* | 8/2019 | Fruchter | G06T 19/006 |

* cited by examiner

*Primary Examiner* — Krishna P Neupane
(74) *Attorney, Agent, or Firm* — Kilpatrick Townsend & Stockton LLP

(57) ABSTRACT

A flat-panel display device and method to prevent display panel burn-in through a decimated look-up table with pixel shifting in a display or an augmented reality display.

20 Claims, 3 Drawing Sheets

DECIMATED BURN-IN COMPENSATION WITH PIXEL SHIFTING

CROSS-REFERENCES TO RELATED APPLICATIONS

This application claims the benefit of U.S. Provisional Application No. 62/726,876, filed Sep. 4, 2018, entitled "DECIMATED BURN-IN COMPENSATION WITH PIXEL SHIFTING" the disclosure of which is incorporated by reference herein in its entirety.

BACKGROUND

Field

Aspects of the disclosure relate in general to displays. Aspects include a method and device to prevent display panel burn-in through a decimated look-up table with pixel shifting in a flat-panel display or an augmented reality display.

Description of the Related Art

Displays are electronic viewing technologies used to enable people to see content, such as still images, moving images, text, or other visual material.

A flat-panel display includes a display panel including a plurality of pixels arranged in a matrix format. The display panel includes a plurality of scan lines formed in a row direction (y-axis) and a plurality of data lines formed in a column direction (x-axis). The plurality of scan lines and the plurality of data lines are arranged to cross each other. Each pixel is driven by a scan signal and a data signal supplied from its corresponding scan line and data line.

Flat-panel displays can be classified as passive matrix type light emitting display devices or active matrix type light emitting display devices. Active matrix panels selectively light every unit pixel. Active matrix panels are used due to their resolution, contrast, and operation speed characteristics.

One type of active matrix display is an active matrix organic light emitting diode (AMOLED) display. The active matrix organic light emitting display produces an image by causing a current to flow to an organic light emitting diode to produce light. The organic light emitting diode is a light-emitting element in a pixel. The driving thin film transistor (TFT) of each pixel causes a current to flow in accordance with the gradation of image data.

Flat-panel displays are used in many portable devices such as laptops and mobile phones.

Screen burn-in, image burn-in or ghost image, is a discoloration of areas on a display caused by cumulative non-uniform use of the pixels.

In organic light emitting diode (OLED) displays the wide variation in luminance degradation will cause noticeable color drift over time where one of the red-green-blue (RGB) colors becomes more prominent due to luminance degradation of the light-emitting pixels.

In the case of liquid crystal displays (LCDs), the mechanics of burn-in are different. For LCDs, burn-in develops in some cases because pixels permanently lose their ability to return to their relaxed state after a continued static use profile. In most typical usage profiles, this image persistence in LCD is only transient.

In desktop computer applications, "screensaver" software actively attempts to stave off screen burn. By ensuring that no pixel or group of pixels was left displaying a static image for extended periods of time, phosphor luminosity was preserved. Modern screensavers can turn off the screen when not in use.

SUMMARY

Embodiments include an electronic display designed to prevent display panel burn-in through a decimated look-up table with pixel shifting in a flat-panel display or an augmented reality display.

In one embodiment, an electronic display comprises a display panel and a decimated burn-in compensator. The decimated burn-in compensator is configured to receive an image frame and output a compensated output frame to the display panel. The decimated burn-in compensator further comprises a pixel shifter, a downsampler, an N×N bin compensating look up table, an interpolator, and a multiplier. The pixel shifter is configured to receive the image frame and to shift the image frame by a predetermined number of pixels resulting in a shifted image frame. The downsampler is configured to receive the image frame and to downsample time image frame into a downsampled image frame. The N×N bin compensating look up table is configured to receive the downsampled image frame and compensate the downsampled image frame into a compensated image frame. The interpolator is configured to receive the compensated image frame and interpolate the compensated image frame into an interpolated image frame. The multiplier is configured to combine the shifted image frame and the interpolated image frame, resulting in the compensated output frame. The display panel is further configured to display the compensated output frame.

In an augmented reality embodiment, image data comes from two sources—a real-world image component captured by a digital camera, and a virtual image component generated by a graphics processing unit (GPU). An augmented reality display comprises a display panel, a graphics processing unit, a camera, a blend unit, and a decimated burn-in compensator. The graphics processing unit is configured to generate a virtual image frame. The camera is configured to capture a real-world image frame. The blend unit is configured to receive the virtual image frame from the graphics processing unit, to receive the real-world image frame from the camera, and to combine the virtual image frame with the real-world image frame to produce a combined image frame. The decimated burn-in compensator is configured to receive the combined image frame and output a compensated output frame to the display panel. The decimated burn-in compensator further comprises a pixel shifter, a downsampler, an N×N bin compensating look up table, an interpolator, and a multiplier. The pixel shifter is configured to receive the combined image frame and to shift the image frame by a predetermined number of pixels resulting in a shifted image frame. The downsampler is configured to receive the image frame and to downsample time image frame into a downsampled image frame. The N×N bin compensating look up table is configured to receive the downsampled image frame and to compensate the downsampled image frame into a compensated image frame. N is an integer greater than one. The interpolator is configured to receive the compensated image frame and interpolate the compensated image frame into an interpolated image frame. The multiplier is configured to combine the shifted image frame and the interpolated image frame resulting in the compensated output frame. The display panel is further configured to display the compensated output frame.

In an alternate embodiment, an augmented reality display comprises a display panel, a graphics processing unit, a first decimated burn-in compensator, a camera, a second decimated burn-in compensator, and a blend unit. The graphics processing unit is configured to generate a virtual image frame. The first decimated burn-in compensator is configured to receive the virtual image frame and output a compensated virtual output frame. The first decimated burn-in compensator further comprises: a first pixel shifter, a first downsampler, a first N×N bin compensating look up table, a first interpolator, and a first multiplier. The first pixel shifter is configured to receive the virtual image frame and to shift the virtual image frame by a first predetermined number of pixels resulting in a first shifted image frame. The first downsampler is configured to receive the virtual image frame and to downsample time image frame into a first downsampled image frame. The first N×N bin compensating look up table is configured to receive the first downsampled image frame and to compensate the first downsampled image frame into a first compensated image frame, where N is an integer greater than one. The first interpolator is configured to receive the first compensated image frame and interpolate the first compensated image frame into a first interpolated image frame. The first multiplier is configured to combine the first shifted image frame and the first interpolated image frame resulting in the compensated virtual output frame. The camera is configured to capture a real-world image frame. The second decimated burn-in compensator is configured to receive the real-world image frame and output a compensated real-world output frame. The second decimated burn-in compensator further comprises: a second pixel shifter, a second downsampler, a M×M compensating look up table, a second interpolator, and a second multiplier. The second pixel shifter is configured to receive the real-world image frame and to shift the real-world image frame by a second predetermined number of pixels resulting in a second shifted image frame. The second downsampler is configured to receive the real-world image frame and to downsample time image frame into a second downsampled image frame. The M×M compensating look up table is configured to receive the second downsampled image frame and to compensate the second downsampled image frame into a second compensated image frame, where M is an integer greater than one. The second interpolator is configured to receive the second compensated image frame and interpolate the second compensated image frame into a second interpolated image frame. The second multiplier is configured to combine the second shifted image frame and the second interpolated image frame resulting in the compensated real-world image frame. The blend unit is configured to receive the compensated virtual image frame from the first decimated burn-in compensator, is configured to receive the compensated real-world image frame from the second decimated burn-in compensator, and is configured to combine the compensated virtual image frame with the compensated real-world image frame to produce a combined image frame. The display panel is further configured to display the combined image frame.

BRIEF DESCRIPTION OF THE DRAWINGS

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure.

Also, as a general rule, and unless it is evident to the contrary from the description, where elements in different figures use identical reference numbers, the elements are generally either identical or at least similar in function or purpose.

DETAILED DESCRIPTION

One aspect of the disclosure is the realization that a number of burn-in compensation techniques are sub-optimal. While flat-panel display burn-in can be addressed by per-pixel tracking and compensation, the use of per-pixel tracking results in a large storage and reading look-up-table (LUT). The large amount of dynamic read only memory (DRAM) or static read only memory (SRAM) required increases semiconductor die-area and fabrication cost. Moreover, the use of a large amount of DRAM causes excess power consumption. In turn, higher power consumption results in lower battery life in portable devices, such as tablet computers, mobile phones, virtual reality headset or augmented reality glassesm and augmented reality display smartphones, digital "smart" watches, and other digital devices.

An aspect of the disclosure includes the observation that using an N×N pixel block instead of per-pixel tracking reduces compensation memory band-width and power requirements and saves the look-up-table footprint. This solution reduces the memory and die-size requirements—which decreases manufacturing costs.

In order to better appreciate the features and aspects of the present disclosure, further context for the disclosure is provided in the following section by an implementation of a flat-panel display that prevents display panel burn-in through a decimated look-up table with pixel shifting in the flat-panel display according to embodiments of the disclosure. Alternate embodiments show how such a flat-panel display might be implemented for use in an augmented reality display. These embodiments are for explanatory purposes only and other embodiments may be employed in other display devices. For example, embodiments of the disclosure can be used with any display device that compensates and prevents display panel burn-in through a decimated look-up table with pixel shifting in the flat-panel display.

Figure 1:
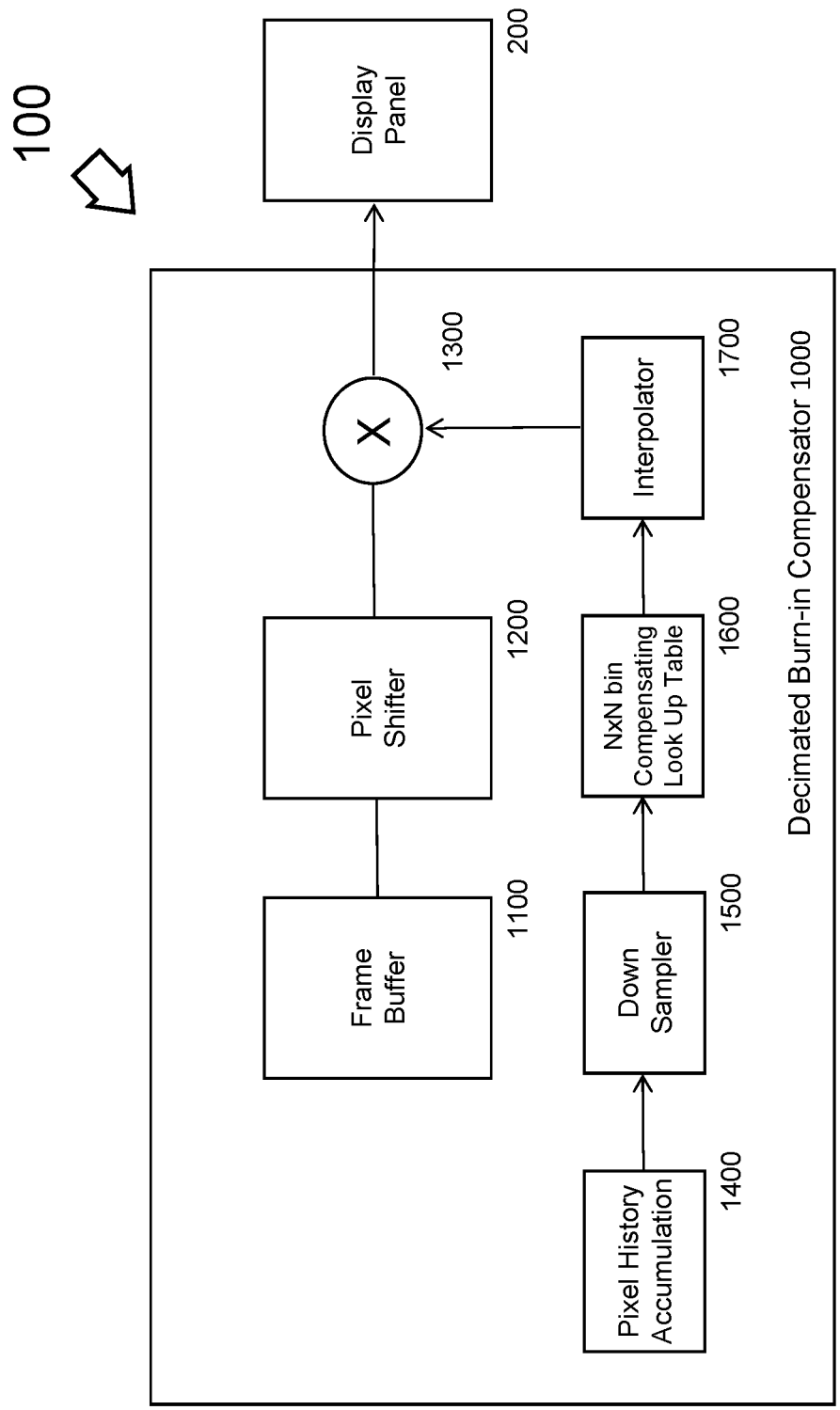
FIG. 1 is a block diagram of a decimated burn-in compensator designed to prevent display panel burn-in through a decimated look-up table with pixel shifting in a flat-panel display.

FIG. 1 is a block diagram of a flat-panel display 100 embodiment with a decimated burn-in compensator 1000 designed to prevent display panel burn-in through a decimated compensating look-up table with pixel shifting in a display panel 200 in accordance with an embodiment of the present disclosure. Flat-panel display 100 may be a stand-alone display, or part of: a computer display, television set, notebook computer, tablet computer, mobile phone, smartphone, augmented reality display, digital "smart" watch, or other digital device. Decimated burn-in compensator 1000 is configured to receive an image frame and output a compensated frame which prevents the display panel burn-in. Essentially, the flat-panel display 100 receives input from two data streams combined by a multiplier: a pixel-shifted image from the frame buffer, and an image passed through a N×N compensating lookup table.

In this embodiment, a flat-panel display 100 has a decimated burn-in compensator 1000 and a display panel 200.

The display panel 200 may be an organic light-emitting diode (OLED) display, such as a passive-matrix (PMOLED) or active-matrix (AMOLED). In other embodiments, the display panel 200 may be a liquid crystal display (LCD) or micro-light emitting diode (micro-LED) display. The display panel 200 displays an image received from a decimated burn-in compensator 1000.

Decimated burn-in compensator 1000 uses a combination of pixel shifting and compensating for an N×N pixel block, where N is a decimation factor represented by an integer greater than one. For example, in some embodiments N is two. Accordingly, the decimated burn-in compensator 1000 comprises a pixel shifter 1200 and an N×N bin compensating look up table 1600. Embodiments of the decimated burn-in compensator 1000 may also comprise a frame buffer 1100, pixel history accumulation 1400, a down sampler 1500, an interpolator 1700, and a multiplier 1300.

Frame buffer 1100 is a portion of random access memory (RAM) containing bitmap image frame data to drive a display panel 200. For the purposes of this embodiment, frame buffer 1100 stores at least one image frame of data. Frame buffer 1100 may receive an image frame of data from an external graphics card or driver (not shown), and forwards the image frame to pixel shifter 1200.

Pixel shifter 1200 receives the image frame from frame buffer 1100 and periodically (vertically and/or horizontally) shifts the image by a predetermined number of pixels. In some embodiments, the image frame is shifted in a circle in a defined rhythm and pixel interval. Pixel shifter 1200 may shift the image frame imperceptibly to a viewer of display panel 200.

When pixels within an N×N pixel block have substantially different content history, there is a danger for overcompensating less burnt-in pixels, and under compensating for other pixels. By periodically shifting content, pixel shifter 1200 smooths out stress level differences within the N×N pixel block.

Images may be shifted by a maximum of 1, 2, 4, 8, 12, or 16 pixels. The image shift may occur in 1×1 or 2×2 pixels shift per step. In other embodiments, images may be shifted by 1-16 pixels. The number of pixels shifted may be related to the N×N pixel block decimated compensation. For example, in one embodiment, a 1-pixel shift may be used with an 8×8 pixel block. In effect, pixel shifting distributes burn-in content stress, and is equivalent to applying low pass filtering to content before burn-in stress (BIS). Larger binning results in a smoother gradient of a low pass filter, and smaller error at a sharp image edge. A longer range of image shifting achieves a good smoothing effect.

Pixel history accumulation 1400 is a computer memory that stores a history of previously displayed image frames. Pixel history accumulation 1400 may be a Random Access Memory (RAM), flash memory, and the like. In some embodiments, pixel history accumulation 1400 includes images from frame buffer 1100.

Down sampler 1500 receives a previously displayed image frame from pixel history accumulation 1400 and decimates the image to reduce its size. The decimation process reduces the image into N×N pixel bins, where N is a decimation factor represented by an integer number greater than or equal to two (2). The reduction in size by $N^2$ significantly saves on the size of a look-up table used by the decimated burn-in compensator 1000, and reduces the amount of memory used as well.

N×N bin compensating look up table 1600 allows decimated burn-in compensator 1000 to apply characteristic curves to an image frame received from down sampler 1500. In this application, N×N bin compensating look up table 1600 assign an output value to every possible N×N input value, which allows correcting color space calculations to performed quickly and thus preventing burn-in. In the N×N bin compensating look up table 1600, N is a decimation factor represented by an integer greater than one. It is understood by one skilled in the art that N×N bin compensating look up table 1600 would facilitate image contrast, brightness changes, grey value spreading, individual gradation tables or enhancing image gamma. Once the image frame is compensated by the N×N compensating lookup table 1600, a compensated image is produced and sent to interpolator 1700.

Interpolator 1700 resizes the compensated image received from N×N compensating lookup table 1600 into an upscaled image that matches the native resolution of display panel 200. The upscaled image is forwarded to multiplier 1300 which acts as a compositing block to combine the upscaled image with the shifted image from pixel shifter 1200. The resulting image is output by the decimated burn-in compensator 1000 to display panel 200.

Figure 2:
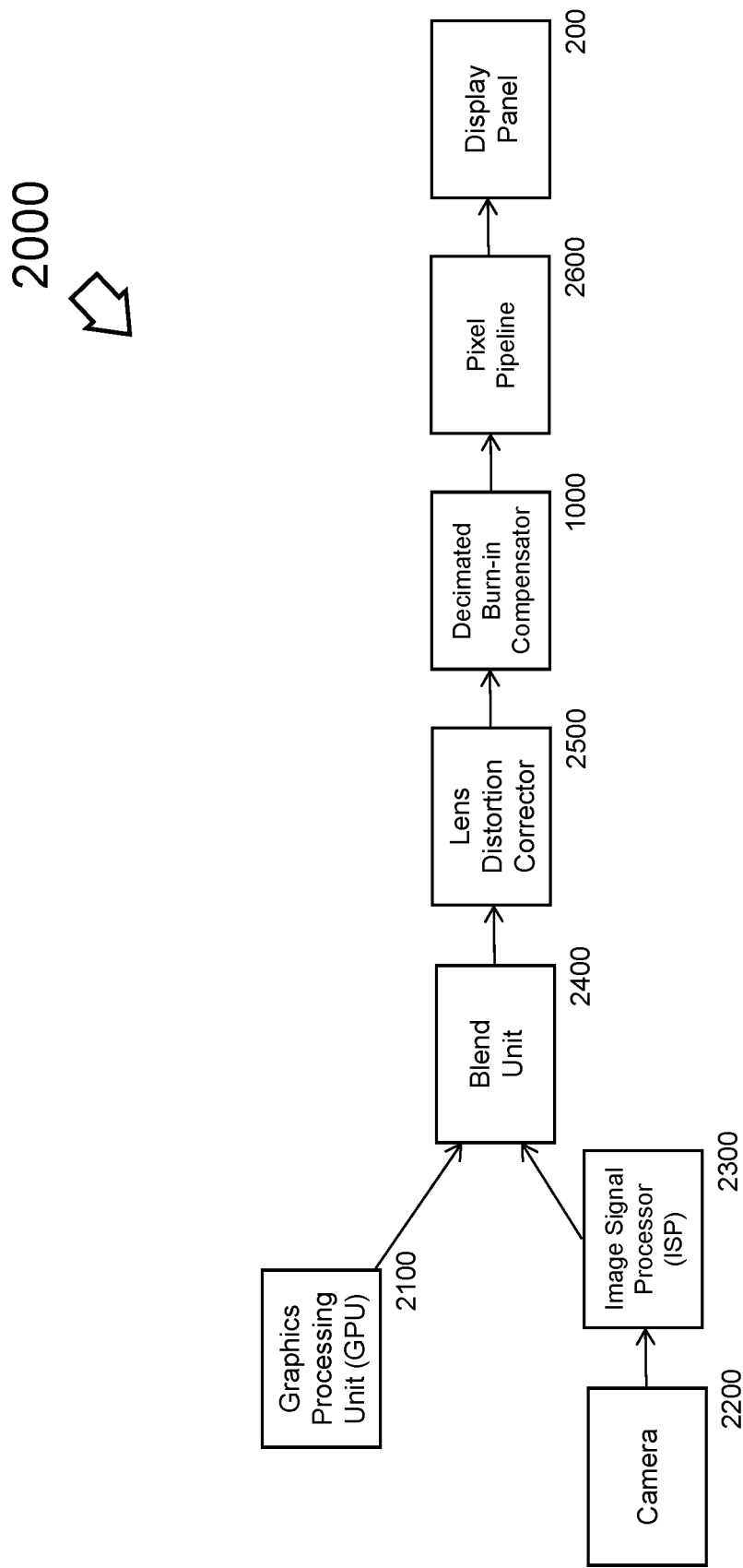
FIG. 2 depicts a flat-panel display with a single decimated burn-in compensator designed to compensate a combined augmented reality image to prevent burn-in at a display panel.
Figure 3:
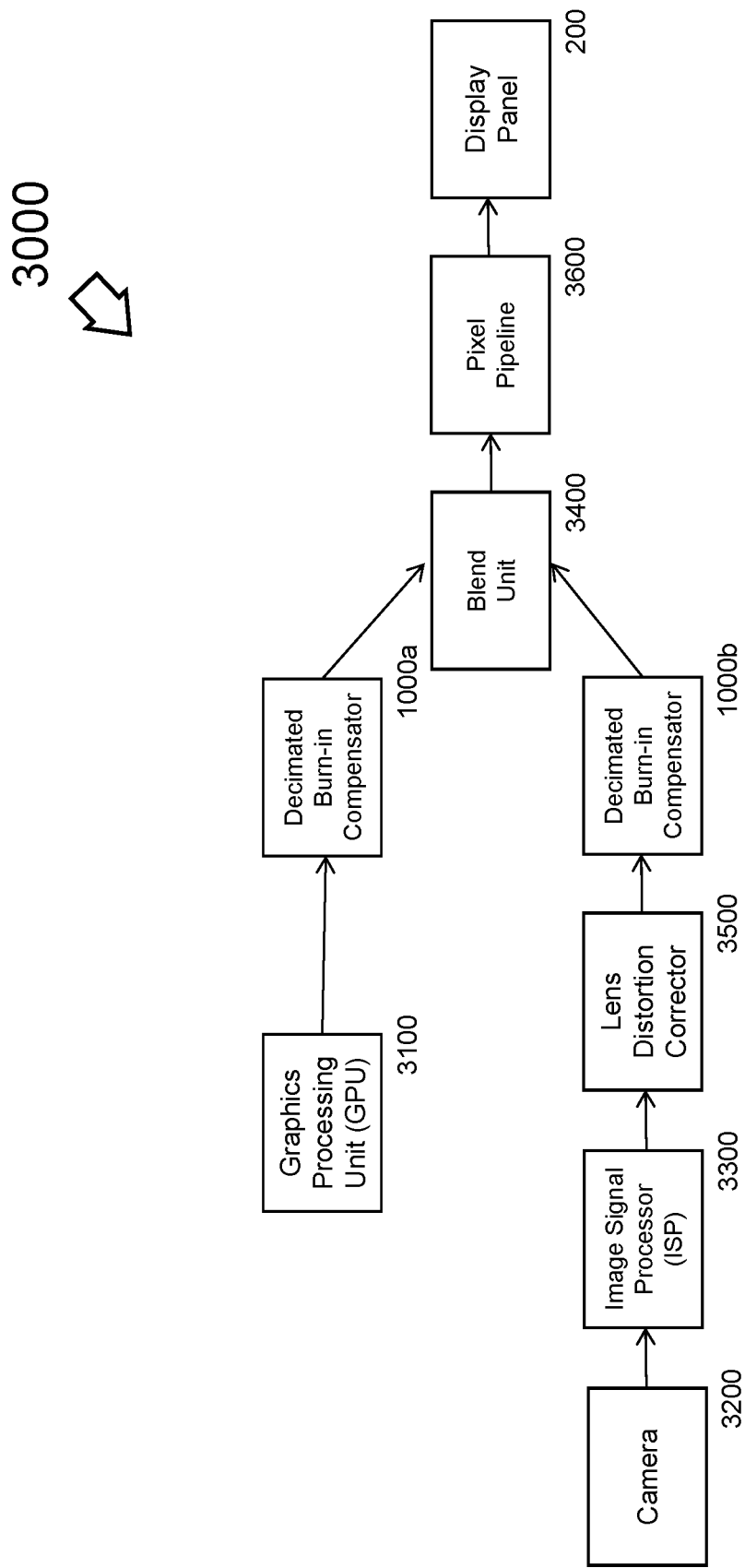
FIG. 3 illustrates a flat-panel display used in an augmented reality embodiment, with two decimated burn-in compensators designed to compensate a real-world image component and a virtual image component to prevent burn-in at a display panel.

We now turn to FIGS. 2-3, which each depict alternate embodiments of a flat-panel display used in an augmented reality application. Each of the alternate embodiments includes a decimated burn-in compensator 1000 designed to prevent display panel burn-in. In augmented reality embodiments, image data comes from two sources—a real-world image component captured by a digital camera, and a virtual image component generated by a graphics processing unit (GPU). The two sources are combined by a blend unit, and eventually projected on a display panel. Depending upon the implementation of a particular embodiment, a decimated burn-in compensator may be used to compensate each of the two image data sources, or the combined image data.

It is understood by one skilled in the art that the embodiments depicted in FIGS. 2-3 may include one or more image frame buffers, which are not shown.

FIG. 2 depicts a flat-panel display 2000 with a single decimated burn-in compensator 1000 designed to compensate a combined augmented reality image to prevent burn-in at a display panel 200, in accordance with an embodiment of the present disclosure.

A virtual image component is comprised of a plurality of virtual image frames generated by a graphics processing unit 2100. Graphics processing unit 2100 may be an application specific integrated circuit (ASIC) designed to rapidly manipulate and alter memory to accelerate the creation of images in a frame buffer. In other embodiments, the graphics processing unit 2100 may be embedded on a central processing unit (CPU) die or a motherboard of the flat-panel display 2000. Once generated by the graphics processing unit 2100, the virtual image frame is forwarded to blend unit 2400 to be combined with a real-world image frame.

A real-world image component is comprised of a plurality of real-world image frames captures by a camera 2200. Camera 2200 may be any optical capture system with a digital image sensor, such as a charge-coupled device (CCD) or complementary metal-oxide-semiconductors (CMOS). Once captured by the camera 2200, the real-world image frame is forwarded to image signal processor (ISP) 2300.

Image signal processor 2300 is a digital signal processor (DSP) integrated circuit specialized for image processing data from camera 2200. In particular, image signal processor 2300 may perform the Bayer transformation or demosaicing to enable color accuracy, noise reduction, image sharpening or interpolation to size the captured image received from camera 2200. Image signal processor 2300 may implement single instruction, multiple data (SIMD) or multiple instruction, multiple data (MIMD) techniques to enable parallel processing of image data. The resulting imaged processed real-world image frame is forwarded to blend unit 2400 to be combined with the virtual image frame.

Blend unit 2400 is a specialized image processing unit to combine a virtual image frame with a real-world image frame. Blend unit 2400 may treat the virtual image frame and the real-world image frame as two layers to be blended together. In such an embodiment, the virtual image frame is treated as a "top layer" or "active layer" image to be superimposed on top of a real-world "bottom layer" image. The resulting blended image is an augmented reality image forwarded to lens distortion corrector 2500.

Lens distortion corrector 2500 is an image processor used to correct for radial (optical) distortion caused by a lens in the camera 2200. In some embodiments, lens distortion corrector 2500 is implemented as a software or firmware correction that may use the Brown-Conrady distortion model to correct for radial distortion and for tangential image distortion. Once distortion corrected, the corrected image is sent to decimated burn-in compensator 1000. The decimated burn-in compensator 1000 prevents display panel burn-in through a decimated compensating look-up table with pixel shifting, as described in FIG. 1. The resulting image is forwarded on to a pixel pipeline 2600.

In the art, pixel pipeline 2600 is sometimes also referred to as a computer graphics pipeline, rendering pipeline or graphics pipeline. Pixel pipeline 2600 renders a three-dimensional scene on to a two-dimensional display screen. It is understood by one skilled in the art, that the rendering for this operation depends upon the software and hardware used, and the characteristics of display panel 200. Typically, pixel pipeline 2600 performs a real-time rendering implemented in hardware. The resulting image can then be displayed at display panel 200.

In an alternate implementation, FIG. 3 depicts a flat-panel display 3000 used in an augmented reality embodiment, with two decimated burn-in compensators 1000*a-b* designed to separately compensate a real-world image component and a virtual image component before the images are combined and displayed at a display panel 200.

The virtual image component is comprised of a plurality of virtual image frames generated by a graphics processing unit 3100. Graphics processing unit 3100 may be an application specific integrated circuit designed to rapidly manipulate and alter memory to accelerate the creation of images in a frame buffer. In other embodiments, the graphics processing unit 3100 may be embedded on a central processing unit die or a motherboard of the flat-panel display 200. Once generated by the graphics processing unit 3100, the virtual image frame is forwarded to a first decimated burn-in compensator 1000*a*. The first decimated burn-in compensator 1000*a* prevents display panel burn-in through a decimated compensating look-up table with pixel shifting, as described in FIG. 1. The resulting image is forwarded on to blend unit 3400 to be combined with a real-world image frame.

The real-world image component is comprised of a plurality of real-world image frames captures by a camera 3200. Camera 3200 may be any optical capture system with a digital image sensor, such as a charge-coupled device or complementary metal-oxide-semiconductors. Once captured by the camera 3200, the real-world image frame is forwarded to image signal processor 3300.

Image signal processor 3300 is a digital signal processor integrated circuit specialized for image processing data from camera 3200. In particular, image signal processor 3300 may perform demosaicing or the Bayer transformation to enable color accuracy, noise reduction, image sharpening or interpolation to size the captured image received from camera 3200. Image signal processor 3300 may enable parallel processing of image data through single instruction, multiple data (SIMD) or multiple instruction, multiple data (MIMD) techniques. The resulting imaged processed real-world image frame is forwarded to tlens distortion corrector 3500.

The lens distortion corrector 3500 is an image processor used to correct for radial (optical) distortion caused by a lens in the camera 3200. In some embodiments, lens distortion corrector 2500 is implemented as a software or firmware correction that may use the Brown-Conrady distortion model to correct for radial distortion and for tangential image distortion. Once distortion corrected, the corrected image is sent to a second decimated burn-in compensator 1000*b*.

The second decimated burn-in compensator 1000*b* prevents display panel burn-in through a decimated compensating look-up table with pixel shifting, as described in FIG. 1. It is understood by one skilled in the art that the second decimated burn-in compensator 1000*b* does not have to shift an image the same number of pixels as the first decimated burn-in compensator 1000*a*, and may use a different N×N bin (designated "M×M," where M is greater than one) for image compensation. In other embodiments, the first decimated burn-in compensator 1000*a* and the second decimated burn-in compensator 1000*b* may shift an image the same number of pixels, and may use the same N×N bin compensating look up table 1600. The resulting image is forwarded on to blend unit 3400 to be combined with the virtual image frame.

A specialized image processor, blend unit 3400, combines the virtual image frame with the real-world image frame. Blend unit 3400 may treat the virtual image frame and the real-world image frame as two layers to be blended together. In such an embodiment, the virtual image frame is treated as a "top layer" or "active layer" image to be superimposed on top of a real-world "bottom layer" image. The resulting blended image is an augmented reality image forwarded to a pixel pipeline 3600.

In the art, pixel pipeline 3600 is sometimes also referred to as a computer graphics pipeline, rendering pipeline or graphics pipeline. Pixel pipeline 3600 renders a three-dimensional scene on to a two-dimensional display screen. It is understood by one skilled in the art, that the rendering for this operation depends upon the software and hardware used, and the characteristics of display panel 200. Typically, pixel pipeline 3600 performs a real-time rendering implemented in hardware. The resulting image can then be displayed at display panel 200.

It is understood by those familiar with the art that the system described herein may be implemented in a variety of hardware or firmware solutions.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. An electronic display comprising:
   a display panel;
   a decimated burn-in compensator configured to receive an image frame and output a compensated output frame to the display panel, the decimated burn-in compensator further comprising:
      a pixel shifter configured to receive the image frame and to shift the image frame by a predetermined number of pixels resulting in a shifted image frame;
      a downsampler configured to receive the image frame and to downsample the image frame into a downsampled image frame;
      an N×N bin compensating look up table configured to receive the downsampled image frame and to compensate the downsampled image frame into a compensated image frame, where N is an integer greater than one;
      an interpolator configured to receive the compensated image frame and interpolate the compensated image frame into an interpolated image frame;
      a multiplier configured to combine the shifted image frame and the interpolated image frame resulting in the compensated output frame; and
   the display panel is further configured to display the compensated output frame.

2. The electronic display of claim 1, wherein N is 2.

3. The electronic display of claim 2, wherein the predetermined number of pixels of the pixel shifter is between 1-16.

4. The electronic display of claim 3, wherein the display panel is a light-emitting diode or liquid crystal display.

5. The electronic display of claim 4, the electronic display is integrated in a tablet computer, digital watch, mobile phone, virtual reality headset or augmented reality glasses.

6. The electronic display of claim 3, wherein the display panel is an organic light-emitting diode display.

7. The electronic display of claim 6, the electronic display is integrated in a tablet computer, digital watch, or mobile phone.

8. An augmented reality display comprising:
   a display panel;
   a graphics processing unit configured to generate a virtual image frame;
   a camera configured to capture a real-world image frame;
   a blend unit configured to receive the virtual image frame from the graphics processing unit, configured to receive the real-world image frame from the camera, and configured to combine the virtual image frame with the real-world image frame to produce a combined image frame;
   a decimated burn-in compensator configured to receive the combined image frame and output a compensated output frame to the display panel, the decimated burn-in compensator further comprising:
      a pixel shifter configured to receive the combined image frame and to shift the image frame by a predetermined number of pixels resulting in a shifted image frame;
      a downsampler configured to receive the image frame and to downsample time image frame into a downsampled image frame;
      an N×N bin compensating look up table configured to receive the downsampled image frame and to compensate the downsampled image frame into a compensated image frame, where N is an integer greater than one;
      an interpolator configured to receive the compensated image frame and interpolate the compensated image frame into an interpolated image frame;
      a multiplier configured to combine the shifted image frame and the interpolated image frame resulting in the compensated output frame; and
   the display panel is further configured to display the compensated output frame.

9. The augmented reality display of claim 8, wherein N is 2.

10. The augmented reality display of claim 9, wherein the predetermined number of pixels of the pixel shifter is between 1-16.

11. The augmented reality display of claim 10, wherein the display panel is a light-emitting diode or liquid crystal display.

12. The augmented reality display of claim 11, the augmented reality display is integrated in a tablet computer, digital watch, or mobile phone.

13. The augmented reality display of claim 10, wherein the display panel is an organic light-emitting diode display.

14. The augmented reality display of claim 13, the augmented reality display is integrated in a tablet computer, digital watch, mobile phone, virtual reality headset or augmented reality glasses.

15. An augmented reality display comprising:
   a display panel;
   a graphics processing unit configured to generate a virtual image frame;
   a first decimated burn-in compensator configured to receive the virtual image frame and output a compensated virtual output frame, the first decimated burn-in compensator further comprising:
      a first pixel shifter configured to receive the virtual image frame and to shift the virtual image frame by a first predetermined number of pixels resulting in a first shifted image frame;
      a first downsampler configured to receive the virtual image frame and to downsample time image frame into a first downsampled image frame;
      a first N×N bin compensating look up table configured to receive the first downsampled image frame and to compensate the first downsampled image frame into a first compensated image frame, where N is an integer greater than one;
      a first interpolator configured to receive the first compensated image frame and interpolate the first compensated image frame into a first interpolated image frame; and
      a first multiplier configured to combine the first shifted image frame and the first interpolated image frame resulting in the compensated virtual output frame;
   a camera configured to capture a real-world image frame;
   a second decimated burn-in compensator configured to receive the real-world image frame and output a compensated real-world output frame, the second decimated burn-in compensator further comprising:
      a second pixel shifter configured to receive the real-world image frame and to shift the real-world image frame by a second predetermined number of pixels resulting in a second shifted image frame;

a second downsampler configured to receive the real-world image frame and to downsample time image frame into a second downsampled image frame;

a M×M compensating look up table configured to receive the second downsampled image frame and to compensate the second downsampled image frame into a second compensated image frame, where M is an integer greater than one;

a second interpolator configured to receive the second compensated image frame and interpolate the second compensated image frame into a second interpolated image frame;

a second multiplier configured to combine the second shifted image frame and the second interpolated image frame resulting in the compensated real-world image frame; and a blend unit configured to receive the compensated virtual image frame from the first decimated burn-in compensator, configured to receive the compensated real-world image frame from the second decimated burn-in compensator, and configured to combine the compensated virtual image frame with the compensated real-world image frame to produce a combined image frame;

the display panel is further configured to display the combined image frame.

16. The augmented reality display of claim 15, wherein N is 2.

17. The augmented reality display of claim 16, wherein the first predetermined number of pixels of the first pixel shifter is between 1-16.

18. The augmented reality display of claim 17, wherein M is 2.

19. The augmented reality display of claim 18, wherein the second predetermined number of pixels of the second pixel shifter is between 1-16.

20. The augmented reality display of claim 19, wherein the display panel is a light-emitting diode or liquid crystal display.

* * * * *